United States Patent [19]

Pratt

[11] 4,049,097
[45] Sept. 20, 1977

[54] KNOB WITH LOCK RELEASE MEANS
[75] Inventor: Albert R. Pratt, Weston, Mass.
[73] Assignee: Raytheon Company, Lexington, Mass.
[21] Appl. No.: 648,613
[22] Filed: Jan. 12, 1976
[51] Int. Cl.² .............................................. F16D 67/00
[52] U.S. Cl. .................................................... 192/8 R
[58] Field of Search ................................. 192/8 R, 15

[56] References Cited
U.S. PATENT DOCUMENTS

| | | | |
|---|---|---|---|
| 2,787,353 | 4/1957 | Spraragen | 192/8 R |
| 3,169,505 | 2/1965 | Spraragen | 192/8 R X |
| 3,198,477 | 8/1965 | Allenbaugh | 192/8 R X |
| 3,240,300 | 3/1966 | McKay | 192/8 R |
| 3,576,240 | 4/1971 | Nicholson | 192/8 R |

Primary Examiner—Benjamin W. Wyche
Attorney, Agent, or Firm—John T. Meaney; Joseph D. Pannone; Harold A. Murphy

[57] ABSTRACT

A push-to-turn knob assembly comprising a fixed race suitably disposed for encircling a rotatable shaft and having therein alternate pairs of resiliently spaced rollers which bindingly engage adjacent projections of an axially disposed cam cylinder, and interposed arcuate portions of a releasing disc which is rotatably maintained in the race by an overlying annular shoulder of the cam cylinder, the releasing disc having an outwardly extending flange wherein a plurality of slots are disposed in alignment with respective keys attached to an enclosing wall of a resiliently positioned knob shell.

11 Claims, 4 Drawing Figures

KNOB WITH LOCK RELEASE MEANS

BACKGROUND OF THE INVENTION

1. Field of the Invention

This invention relates generally to adjustment knobs and is concerned more particularly with a knob assembly having means for controllably locking a rotatable shaft in a desired angular position.

2. Discussion of the Prior Art

Control devices, such as valves, timers, rheostats, potentiometers, and the like, generally are provided with a protruding shaft which may be rotated to adjust the device to a desired setting. A coaxially disposed knob may be affixed to a distal end portion of the shaft such that rotation of the knob produces a corresponding rotation of the shaft. Also, for critically adjusted devices, for example, the knob may be provided with suitable locking means for maintaining the rotatable shaft in a selected angular position, until a new adjustment is required.

Thus, U.S. Pat. No. 2,787,353 granted to L. Sparagen on Apr. 21, 1957 discloses a push-to-turn knob assembly having a resiliently biased locking means for preventing inadvertent rotation of an adjustment shaft. The referenced knob assembly comprises a fixed race encircling the shaft and having therein pairs of resiliently spaced rollers which bindingly engage adjacent projections of an axially disposed cam cylinder. The cam cylinder surrounds the shaft and is provided with suitable means, such as a radial binding screw, for example, for fixedly engaging the shaft. Surrounding the cam cylinder is an axially coextensive, releasing cylinder having arcuate end portions disposed between respective adjacent pairs of the ball members within the race. The cam cylinder and the releasing cylinder extend axially beyond the distal end of the shaft and have adjacent end portions provided with respective diametrically aligned slots. The slots are aligned with a key extending axially from the closed end of a resiliently positioned knob shell which encloses the assembly.

In operation, the knob shell is pressed axially and rotated thereby causing the key to initially engage a side of the slot in the releasing cylinder and then a side of the slot in the cam cylinder. Accordingly, the slightest rotation of the releasing cylinder exerts a pressure on the resiliently spaced rollers in the race to move them out of binding engagement with the cam cylinder and unlock the attached shaft. Subsequent rotation of the releasing cylinder and the cam cylinder produces a corresponding rotation of the shaft whereby the control device is adjusted to a new setting. Releasing the knob shell withdraws the key from the slots thereby removing the pressure from the resiliently spaced rollers in the race. Consequently, the rollers exert a resilient counter-pressure on the interposed arcuate portions of the releasing cylinder and move back into binding engagement with adjacent projections of the cam cylinder, thereby locking the attached shaft in the newly adjusted position.

However, it has been found that the reference knob assembly may not operate as described due to a build-up of tolerances between the coaxially disposed inner cam cylinder, the intermediate releasing cylinder, and the cylindrical wall of the outer knob shell. Thus, the outer diameter of the cam cylinder may be oversized or the inner diameter of the releasing cylinder undersized sufficiently to produce frictional engagement therebetween. Similarly, the outer diameter of the releasing cylinder may be oversized or the inner diameter of the knob shell may be undersized sufficiently to produce frictional engagement. In either instance, it has been found that rotation of the knob shell, without applying an axial pressure thereto, may cause the releasing cylinder to exert enough pressure on the resiliently spaced rollers in the race to unlock the cam cylinder and produce a corresponding rotation of the shaft. Furthermore, it has been found that the described frictional engagement may prevent the resiliently spaced rollers from moving back into binding engagement with the cam cylinder and locking the shaft in a newly adjusted position. Consequently, the shaft may be rotated inadvertently, and the purpose of the push-to-turn knob assembly may be frustrated.

Therefore, it is advantageous and desirable to provide a push-to-turn knob assembly of the described type with a releasing member which avoids the problems of frictional engagement with the cam cylinder and the cylindrical wall of the knob shell.

SUMMARY OF THE INVENTION

Accordingly, this invention provides a push-to-turn knob assembly comprising an annular race having therein alternate pairs of resiliently spaced rollers and interposed arcuate portions of a releasing disc which encircle a reduced diameter end portion of an axially disposed cam cylinder. The reduced diameter end portion of the cam cylinder is provided with a plurality of angularly spaced projections which are suitably spaced from an encircling outer wall of the race for bindingly engaging adjacent rollers therein and for permitting rotatable passage of the interposed arcuate portions to release the rollers. The releasing disc is retained rotatably in the race by an overlying shoulder of the cam cylinder, and is provided with an outwardly extending flange wherein a plurality of radial slots are disposed. The slots are axially aligned with respective resiliently spaced keys which extend inwardly from a surrounding wall of an enclosing knob shell.

A larger diameter portion of the cam cylinder extends axially of the assembly and is provided with suitable fastening means, such as a radially journaled binding screw, for example, for fixedly attaching the cam cylinder to an axially disposed, rotatable shaft. The larger diameter portion of the cam cylinder extends beyond the distal end of the shaft and terminates adjacent a closed end of the knob shell. The distal end of the cam cylinder may be provided with diametrically disposed slots which are aligned with conformingly shaped keys extending axially from the closed end of the shell. Also, the distal end of the cam cylinder may be provided with an annular landing which supports a coil spring, whereby the closed end of the knob shell may be resiliently positioned in predetermined spaced relationship with the closed end of the cam cylinder such that the keys partly engage the slots therein. However, rotation of the shell without applying an axial pressure thereto will not produce a corresponding rotation of the shaft, because the cam cylinder is locked in place by the binding engagement with the resiliently spaced rollers in the race.

BRIEF DESCRIPTION OF THE DRAWINGS

For a better understanding of the invention, reference is made in the following more detailed description to the accompanying drawing where.

DESCRIPTION OF THE PREFERRED EMBODIMENT

Figure 1:
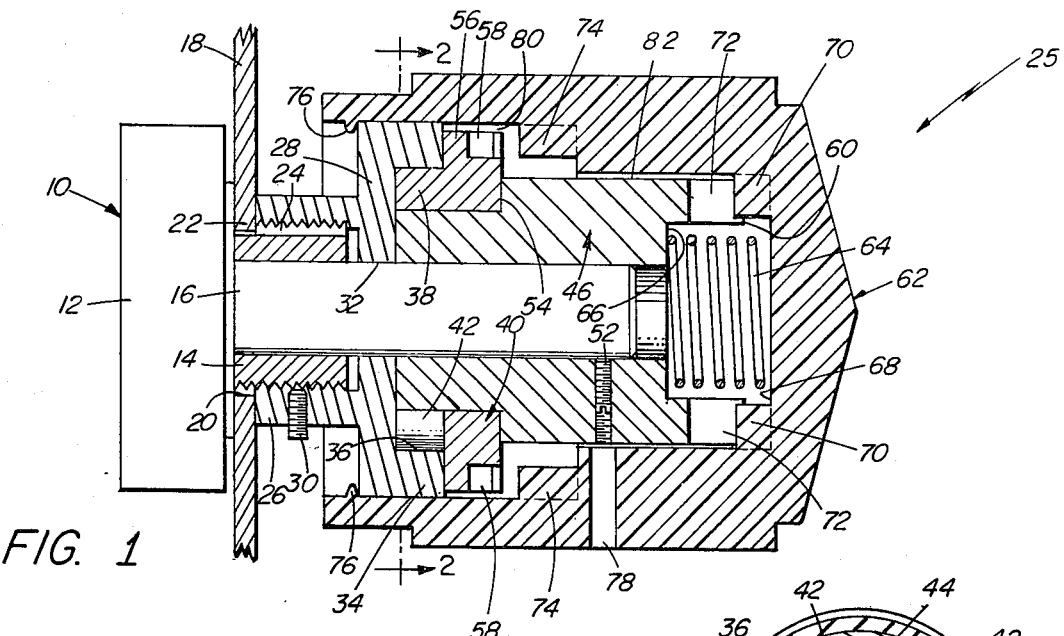
FIG. 1 is an axial sectional view of a knob assembly embodying the invention.

Referring to the drawing wherein like characters of reference designate like parts, there is shown in FIG. 1 a conventional control device 10, such as a potentiometer, for example. The device 10 may comprise a cylindrical body 12 having protruding therefrom an externally threaded collar 14 through which extends a rotatable adjustment shaft 16. Device 10 may be mounted on a rear surface of a control panel 18, for example, by inserting the collar 14 and the shaft 16 axially through a suitable aperture 20 in the panel. A radial tang 22 may extend inwardly of the aperture 20 and slidingly engage a longitudinal slot 24 in the outer surface of collar 14 to prevent rotation of the body 12 in a well-known manner.

The portion of collar 14 projecting outwardly from the front surface of panel 18 may be threadingly engaged by a bushing 26 having one end abutting the panel. The opposing end of bushing 26 is fixedly attached to a closed end of a cup-shaped race 28 which comprises a first component of a positive lock knob assembly 25. Bushing 26 and race 28 are fixedly secured to the collar 14 by conventional means, such as set screw 30 journaled radially through the bushing 26 and into binding engagement with the collar 14, for example. The shaft 16 extends rotatably through the bushing 26 and an aligned aperture 32 centrally disposed in the closed end of cup-shaped race 28. The race 28 is provided with an outer peripheral wall 34 which extends axially outward with respect to the panel 18 and encircles the shaft 16 to define an annular cavity 36 therebetween.

Figure 2:
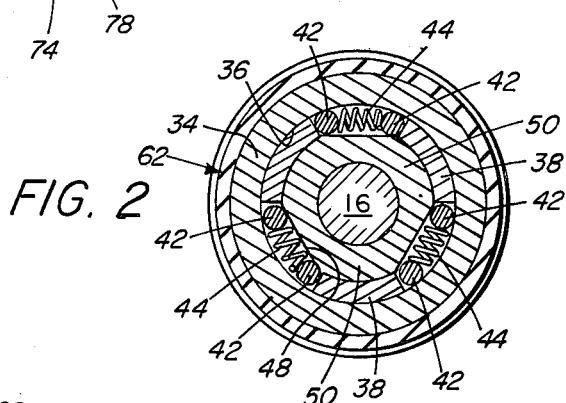
FIG. 2 is a cross-sectional view taken along line 2—2 in FIG. 1 and looking in the direction of the arrows.
Figure 3:
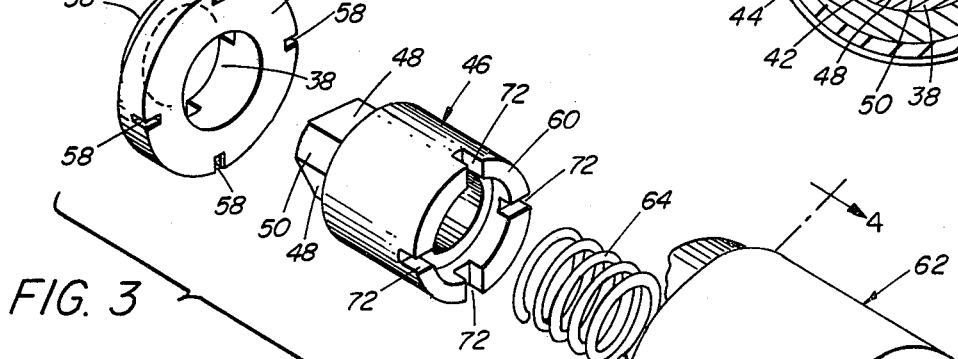
FIG. 3 is an exploded view showing component parts of the knob assembly depicted in FIG. 1.

As shown in FIG. 2, circularly disposed in the cavity 36 and adjacent the wall 34 are alternate arcuate portions 38 of an axially disposed, releasing disc 40 and interposed pairs of resiliently spaced rollers 42. Although three arcuate portions 38 and interposed pairs of rollers 42 are shown by way of illustration, a greater or lesser number thereof may be provided as required. The rollers 38 of each pair are spaced apart by suitable resilient means, such as respective interconnecting coil springs 44, for example, and are provided with appropriate configurations, such as cylindrical, for example. The arcuate portions 38 extend into race 28 from an annular body of releasing disc 40, which is rotatable about a reduced diameter end portion of an axially disposed cam cylinder 46, as shown in FIG. 3.

The reduced diameter end portion of cam cylinder 46 extends into the race 28 and is provided with alternate flatted surfaces 48 and interposed arcuate surfaces 50. The flatted surfaces 48 are disposed adjacent respective pairs of the rollers 42; and the arcuate portions 50 are disposed adjacent respective arcuate portions 38 of the releasing disc 40. Thus arcuate portions 50 form radial projections which are disposed in predetermined spaced relationship with the wall 34 of race 28, such that adjacent rollers 42 are resiliently urged into binding engagement therewith. However, the arcuate projections 50 are spaced sufficiently from the wall 34 to permit rotatable passage of the arcuate portions 38 therebetween. Accordingly, rotation of the releasing disc 40 causes the arcuate portions 38 to exert a pressure against respective rollers 42, thereby releasing them from binding engagement with the projections 50 of cam cylinder 46.

The cam cylinder 46 includes an integral larger diameter portion having sufficient body to threadingly support a fastening means, such as set screw 52, for example, in binding engagement with rotatable shaft 16, particularly when the described assembly is miniaturized. The larger diameter portion of cam cylinder 46 forms adjacent the integrally joined, reduced diameter portion thereof a radially extending, annular shoulder 54. Shoulder 54 serves as a transversely disposed, bearing surface for the releasing disc 40 and provides means for rotatably retaining the disc 40 in the race 28. The disc 40 extends axially out of the race 28 and is provided with an annular flange 56 which extends radially outward beyond the larger diameter portion of cam cylinder 46. The flange 56 overlies the circular rim of peripheral wall 34 and has disposed therein a plurality of angularly spaced, radial release slots 58.

The larger diameter portion of cam cylinder 46 extends axially beyond the distal end of shaft 16 and terminates in a radially slotted rim 60. Rim 60 is disposed adjacent a closed end of a cup-shaped knob shell 62 which encloses the described knob assembly. The closed end of knob shell 62 is positioned with respect to the slotted rim 60 by suitable resilient means, such as coil spring 64, for example. One end of coil spring 64 may be supported on an annular landing 66 provided on the inner surface of cam cylinder 46. The opposing end of coil spring 64 may nest within an aligned recess 68 in the closed end of knob shell 62. Thus, an axial pressure may be applied to the shell 62 to move the closed end thereof toward the slotted rim 60; and when the axial pressure is removed, the closed end of shell 62 will spring away the rim 60 of cam cylinder 46.

Extending axially toward cam cylinder 46 from the closed end of knob shell 62 is a plurality of angularly spaced drive keys 70 which are aligned with respective radial slots 72 in the rim 60. The drive keys 70 may be maintained in operative alignment with the associated drive slots 72 by the coil spring 64 resiliently positioning distal end portions thereof in the entrance portions of the aligned slots 72. The slots 72 are substantially wider than the respective thicknesses of the associated wafer-type keys 70, in order to permit a slight rotation of the knob shell 62 before the drive keys 70 pressingly engage encountered sides of the drive slots 72. However, unless an axial pressure is applied, the drive keys 70 will not rotate the cam cylinder 46 since it is lockingly engaged by the resiliently spaced rollers 42 in the race 28.

Figure 4:
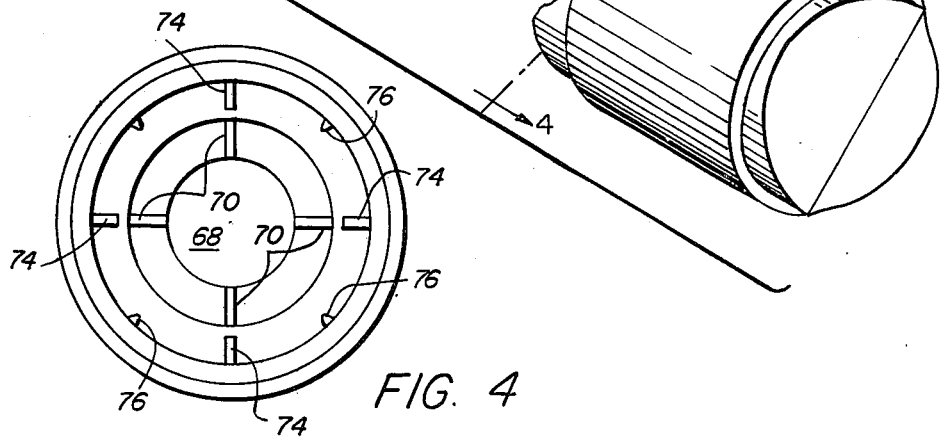
FIG. 4 is a plan view taken along line 4—4 in FIG. 3 and looking in the direction of the arrows.

As shown in FIG. 4, knob shell 62 has a cylindrical wall encircling the described assembly and supports adjacent the releasing disc 40 an inwardly extending array of angularly spaced release keys 74. The release keys 74 may comprise respective axially extending wafers which are similar to the drive keys 72 and may have similar thickness dimensions. Each of the release keys 74 is disposed in axial alignment with a respective one of the release slots 58 in flange 56 of the releasing disc 40. However, in contrast to the drive slots 72 in rim 60 of cam cylinder 46, the release slots 58 are only slightly larger than the thickness of the respectively aligned release keys 74. Consequently, when an axial pressure is applied to the shell 46, the release keys 74 slidingly engage the aligned slots 58 such that a slight rotation of the shell 46 produces a corresponding rotation of the releasing disc 40. Each of the slots 58 may be provided with an inwardly leading taper to compensate for any misalignment permitted by the drive keys 70 in the wider slots 72.

Adjacent the open end of knob shell 46, the cylindrical wall thereof is provided with a plurality of angularly spaced lugs 76 which extend radially inward of the assembly. The lugs 76 snap over the fixed race 28 to produce a unitized knob assembly independently of the control device 10. Thus, the knob shell 62 may be made of flexible plastic material, such as a polycarbonate, for example, which may be molded with the lugs 76, the release keys 74, and the drive keys 70 as integral parts thereof. Accordingly, the described knob assembly 25 need not require one or more retaining rings, as provided in conventional knob assemblies, for producing a unit suitable for shipment independent of any control device, such as 10, for example. For mounting the knob assembly of this invention onto a rotatable shaft, a wall portion of knob shell 62 may be provided with a radially extending aperture 78 which may be rotated into alignment with a fastening means, such as set screw 52, for example. Thus, a suitable tool may be passed through the aperture 78 to engage the fastening means and move it into binding engagement with the rotatable shaft 16.

In operation, an axial pressure is applied to the knob shell 62 to move the drive keys 70 further into the aligned drive slots 72, and to move the release keys 74 into sliding engagement with the aligned release slots 58. A subsequent slight rotation of the knob shell 46 causes the release disc 40 to rotate in a corresponding angular direction and also brings the drive keys 72 into pressing engagement with respective encountered sides of the drive slots 74. When the release disc 40 rotates, the arcuate portions 38 thereof move between the peripheral wall 34 of race 28 and the adjacent arcuate projections 50 of cam cylinder 46. The resulting pressure exerted by the arcuate portions 38 on the adjacent rollers 42 moves them out of binding engagement with the projections 50 of cam cylinder 46 thereby unlocking the shaft 16. Subsequent rotation of knob shell 62 causes a corresponding rotation of release disc 40, cam cylinder 46, and shaft 16 as a unit.

When the shaft 16 has reached a desired angular position, the knob shell 62 is released thereby removing the release keys 74 from the release slots 58. As a result, the resiliently spaced rollers 42 exerting a resilient counterpressure on the arcuate portions 38 of disc 40 rotate it slightly in the opposite angular direction and move back into binding engagement with adjacent projections 50 of the cam cylinder 46. Thus, the attached shaft 16 is locked in the newly selected angular position.

Accordingly, it may be seen that the releasing disc 40 is not disposed between the larger diameter portion of cam cylinder 46 and the cylindrical wall of knob shell 62 where frictional engagement therewith can inadvertently unlock the shaft 16 and prevent relocking thereof. The releasing disc 40 rotates about a reduced diameter portion of the cam cylinder 46 and is rotatably retained in race 28 by an overlying shoulder of cam cylinder 46. Therefore, a relatively large clearance, designated generally as 80, may be provided between the periphery of flange 56 and the encircling portion of knob shell 62. Also, a relatively large clearance, designated generally as 82, may be provided between the larger diameter portion of cam cylinder 46 and the encircling wall portion of knob shell 62. Furthermore, a plurality of release keys 74 engaging the release slots 58 adjacent the outer periphery of disc 40 produce sufficient torque to easily rotate the release disc 40 despite the resilient counterpressure exerted by the spaced rollers 42.

Thus, it may be seen that all of the objectives of this invention have been achieved by the knob assembly disclosed herein. However, it also will be apparent that various changes may be made by those skilled in the art without departing from the spirit of the invention as expressed in the appended claims. It is to be understood, therefore, that all matter shown and described herein is to be interpreted in an illustrative rather than in a limiting sense.

What is claimed is:

1. A knob assembly for mounting on a rotatable shaft and comprising:
    a fixed race having a cylindrical cavity therein and having an outer peripheral wall;
    a rotatable cylinder having a cam-shaped end portion axially disposed in the cavity of the race and having an adjacent radial shoulder, the cam-shaped end portion including a plurality of angularly spaced projections disposed in predetermined spaced relationship with the wall of the race;
    locking means disposed between the projections of the cam-shaped end portion in the cavity of the race for releaseably engaging the cam-shaped end portion of the cylinder;
    a rotatable release disc encircling the cam-shaped end portion of the cylinder and having angularly spaced portions disposed between respective projections of the cam-shaped end portion and the wall of the race, the disc also having an end surface disposed in abutting engagement with the radial shoulder and having overlying the wall of the race a flange provided with a plurality of angularly spaced release slots;
    an enclosing knob shell rotatable about the fixed race and having means for controllably engaging the release means and the cylinder; and
    resilient means coupled to the knob shell and the cylinder for positioning the shell with respect to the cylinder and the disc.

2. A knob assembly as set forth in claim 1 wherein the knob shell engaging means includes a radially disposed array of angularly spaced release keys, each of which is resiliently positioned in spaced axial alignment with a respective one of the slots of the flange.

3. A knob assembly as set forth in claim 2 wherein the radial shoulder of the cylinder is annular and comprises one end of a larger diameter portion of the cylinder.

4. A knob assembly as set forth in claim 3 wherein cylinder is provided with axial bore means for slidably engaging the rotatable shaft; and the larger diameter portion of the cylinder is provided with transversely disposed fastening means for securing the cylinder to the shaft.

5. A knob assembly as set forth in claim 4 wherein the larger diameter portion of the cylinder has radially disposed therein a plurality of angularly spaced drive slots; and the knob shell engaging means includes an array of angularly spaced drive keys, each of which is resiliently positioned within an entrance portion of a respective one of the drive slots.

6. A knob assembly as set forth in claim 5 wherein the release slots are sufficiently wide to slidingly engage the release keys; and the drive slots are sufficiently wider than the interposed dimension of the drive keys to permit relative rotation of the knob shell.

7. A knob assembly as set forth in claim 6 wherein the cam-shaped end portion of the cylinder includes alternate longitudinal flatted surfaces and interposed arcuate projections disposed in predetermined spaced relationship with the peripheral wall of the race.

8. A knob assembly as set forth in claim 7 wherein the locking means includes respective pairs of resiliently spaced rollers disposed between the peripheral wall of the race and each of the flatted surfaces for bindingly engaging adjacent arcuate projections of the cylinder.

9. A knob assembly as set forth in claim 8 wherein the annular release disc includes a plurality of angularly spaced arcuate portions disposed between the peripheral wall of the race and respective arcuate projections of the cylinder, the arcuate portions of the release disc being rotatable into engagement with adjacent rollers of the spaced pairs.

10. A knob assembly as set forth in claim 9 wherein the knob shell is provided adjacent its open end with radially extending lug means is lockingly engaging the peripheral wall of the race.

11. A knob assembly as set forth in claim 10 wherein the knob shell is made of flexible plastic material having the release keys, the drive keys, and the lug means molded as integral parts thereof.

* * * * *